United States Patent [19]

Lynas

[11] Patent Number: 4,971,430
[45] Date of Patent: Nov. 20, 1990

[54] REARVIEW MIRROR TARGETING AND REPOSITIONING SYSTEM

[76] Inventor: Robert M. Lynas, 16866 Landing Dr., Spring Lake, Mich. 49456

[21] Appl. No.: 382,551

[22] Filed: Jul. 19, 1989

[51] Int. Cl.⁵ .................... B60R 1/06; B60R 1/08; G02B 7/18
[52] U.S. Cl. .................................. 350/605; 350/600; 350/637
[58] Field of Search .............. 350/605, 600, 637, 632; 356/138, 150

[56] References Cited

U.S. PATENT DOCUMENTS

| | | | |
|---|---|---|---|
| 1,311,253 | 7/1919 | Stern | 350/600 |
| 2,871,754 | 2/1959 | Marble | 350/600 |
| 4,834,522 | 5/1989 | Janowicz | 350/637 |

FOREIGN PATENT DOCUMENTS

| | | | |
|---|---|---|---|
| 3509655 | 9/1986 | Fed. Rep. of Germany | 350/637 |
| 5128 | 1/1977 | Japan | 350/600 |
| 105105 | 6/1983 | Japan | 350/600 |
| 164638 | 6/1989 | Japan | 350/605 |
| 2148814 | 6/1985 | United Kingdom | 350/637 |

Primary Examiner—Jon W. Henry
Attorney, Agent, or Firm—Varnum, Riddering, Schmidt & Howlett

[57] ABSTRACT

A rearview mirror system for a vehicle includes a plane mirror pivotably mounted to a vehicle having a directional signal means. A solenoid is operatively connected to the plane mirror for automatically changing the position of the plane mirror in response to a signal from the directional signal means in order to render the blind spot viewable to a driver. A reference position corresponding to a properly focused mirror is established by visually aligning an indicium on the mirror with an indicium on the vehicle.

8 Claims, 7 Drawing Sheets

REARVIEW MIRROR TARGETING AND REPOSITIONING SYSTEM

BACKGROUND OF THE INVENTION

1. Field of the Invention

The present invention relates to rearview mirrors for vehicles, and more particularly to a system for improved focusing of a rearview mirror including repositioning a rearview mirror automatically in response to a vehicle directional signal.

2. Description of the Prior Art

Rearview mirrors are commonly used on vehicles to expand the driver's field of vision. The driver can better observe traffic conditions behind the vehicle with a consequent improvement in traffic safety. A conventional rearview mirror system of the type used on passenger cars is shown in FIG. 1 as used in a typical modern three-lane highway. The three lanes are identified with the numerals 1, 2, and 3. Each lane is defined by highway markers 5, 7, where solid lines 5 typically denote the path of travel in a single direction as shown by the arrow, and the spaced lines 7 separate the individual lanes within a given direction of travel. Six vehicles A, B, C, D, E, and F are shown in various positions in the respective lanes. A conventional rearview mirror system installed on vehicle A includes a mirror 10 on the left side of the vehicle, a mirror 12 on the right side of the vehicle, and a mirror 13 and mounted and generally centered within a front portion of the passenger compartment. The mirrors 10, 12 are typically focused to provide a view of objects in the traffic lanes immediately to the left and right, 1 and 3, respectively, and to the rear of vehicle A. Thus a field of view subtended by angle $\alpha$ may be seen in the left-hand mirror 10 from a typical driver's position within vehicle A, and a rear field of view subtended by angle $\beta$ may be seen in right-hand mirror 12. The mirror 13 is typically focused to provide a view of objects immediately behind the vehicle, with a field of view subtended by angle $\Gamma$. Thus, a driver sitting in vehicle A can readily observe the presence and movements of vehicles D, E, and F without shifting the eyes too far out of the line of travel of vehicle A.

However, vehicles B and C are typically not within the driver's field of vision in any of the rearview mirrors 10, 12 or 13. Being slightly behind vehicle A in the direction of travel, vehicles B and C are similarly outside the peripheral vision of the driver in vehicle A. Thus, vehicles B and C are located in positions customarily referred to as the "blind spot", and cannot be seen by a driver in vehicle A unless the driver were to direct the line of vision away from the direction of travel to look either to the left or to the right. Thus, if a driver in vehicle A seeks to move vehicle A to either lanes 1 or 3, the driver must remove his eyes from the road and look to the right or left before changing direction.

To overcome the problem of the "blind spot", it is known to use a variety of convex mirrors either in place of or in addition to rearview mirrors 10, 12. Such mirrors are available with various radii of curvature ranging from about 8 inches to 24 inches which optically expand the field of vision subtended by angles $\alpha$ and $\beta$. However, the images projected by convex mirrors are badly distorted, which make it difficult to identify objects and accurately determine the approximate distance to an object being observed.

Further, drivers frequently do not adjust the mirrors 10, 12, and 13 to obtain the proper focus and thus maintain the optimum field of vision for safety. It is desirable therefore to provide a means whereby a driver can quickly and properly focus a rearview mirror to an optimum position.

It is further desirable to provide a means whereby a driver, upon signaling a change in lane of the vehicle, can readily check the blind spot without distortion and without shifting the field of vision too far out of the line of travel of the vehicle in order to ensure a safe change of lane.

SUMMARY OF THE INVENTION

In accordance with the invention, a rearview mirror system is provided for a vehicle which includes a plane mirror and means for mounting the plane mirror to the vehicle. The plane mirror may be mounted within a housing which in turn is mounted to the vehicle. The vehicle typically has a directional signal means to indicate a change in direction of the vehicle. The invention is directed to an improvement in the rearview mirror system comprising actuating means adapted to receive a signal from the directional signal means and operatively connected to the plane mirror mounting means for automatically changing the position of the plane mirror with respect to the vehicle when the actuating means receives a signal indicating a change in direction of the vehicle.

The directional signal means may typically comprise a first signal to indicate a left turn of the vehicle, and second signal to indicate a right turn of the vehicle, a third signal to indicate a left lane change of the vehicle, and a fourth signal to indicate a right lane change of the vehicle. The plane mirror mounting means itself may comprise a bracket pivotally connected to the housing. The actuating means may be mounted to the housing and operatively connected to the bracket so that the bracket pivots when the actuating means is actuated. The actuating means preferably includes a solenoid having a push rod pivotably connected to the bracket to cause the bracket to pivot from a normal position to an indexed position. In the indexed position, the plane mirror will provide a field of vision to observe the blind spot. Typically, the bracket is moved to the indexed position only in response to the third signal or the fourth signal, either of which indicate a lane change of the vehicle, and not to the first or second signals.

In a typical installation, the plane mirror is pivotably connected to the plane mirror mounting means. The vehicle includes a first visual indicium and the plane mirror includes a second visual indicium which is adapted to be aligned with the first visual indicium by pivoting the plane mirror with respect to the plane mirror mounting means in order to establish a reference position for the plane mirror with respect to the vehicle. Also, the invention provides for delaying the directional signal means before it is received by the actuating means.

BRIEF DESCRIPTION OF THE DRAWINGS

The invention will now be described with reference to the following drawings in which.

DETAILED DESCRIPTION OF THE DRAWINGS

Figure 2:
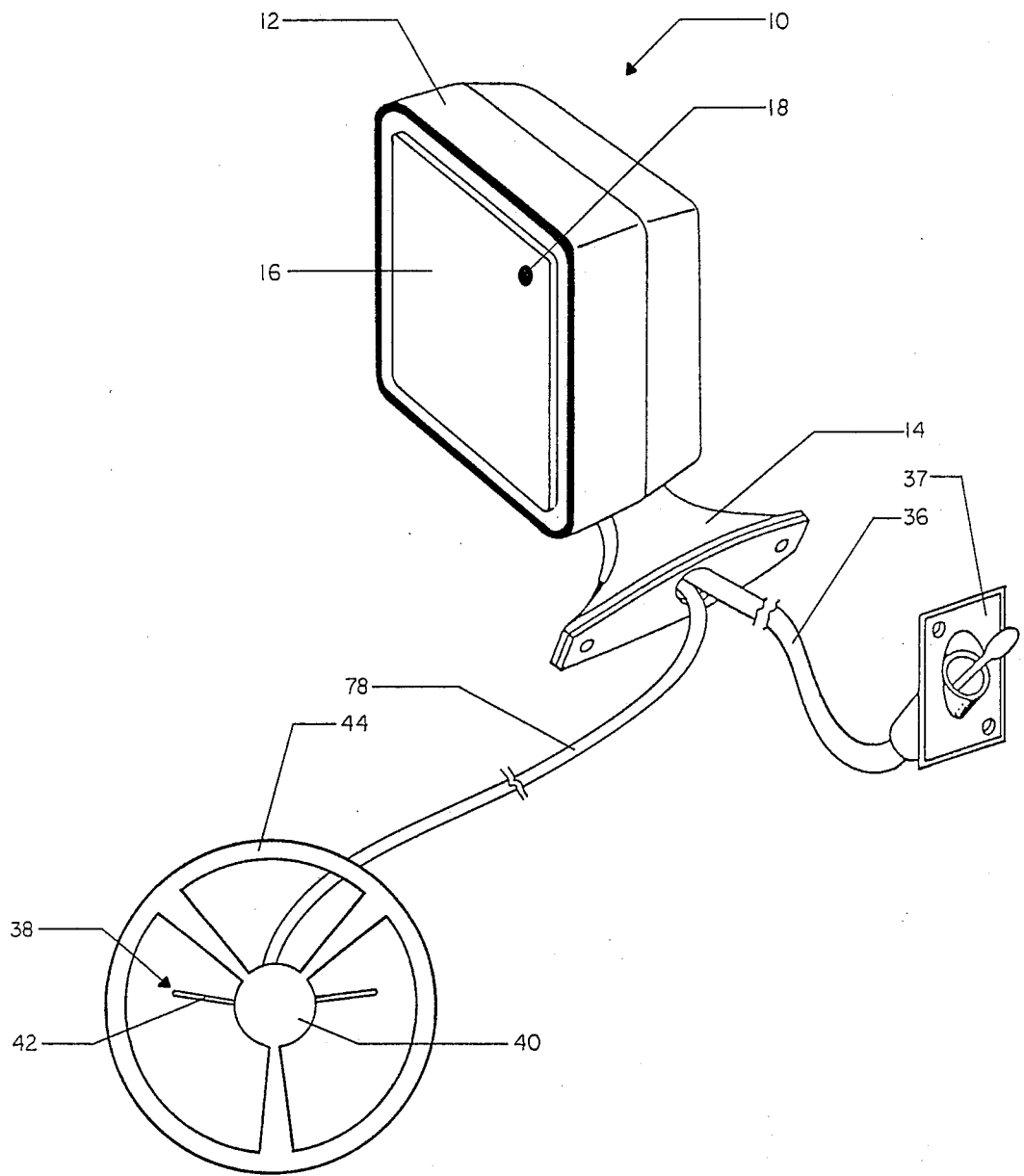
FIG. 2 is a perspective view of a rearview mirror for a vehicle in accordance with the invention.

Referring now more particularly to FIG. 2, a rearview mirror repositioning system includes a rearview mirror assembly 10 which includes a housing 12 and a base 14. The base 14 is contoured to provide a structure adapted to blend with the styling of a portion of a vehicle (not shown in FIG. 2). The rearview mirror assembly is typically secured to the front fender or the door on the right or left side of the vehicle, or both. In the embodiment shown, it is contemplated that the mirror is mounted on the door. The base 14 is adapted to be secured thereto by suitable fastening means (not shown). The base 14 may be integral with the housing 12 to form one unitary piece. A plane mirror 16 is mounted within the housing and is adapted to provide a field of vision to a driver sitting in the vehicle toward the rear thereof. A visual indicium 18 is located on the surface of the plane mirror for a purpose to be described hereinafter.

Figure 3:
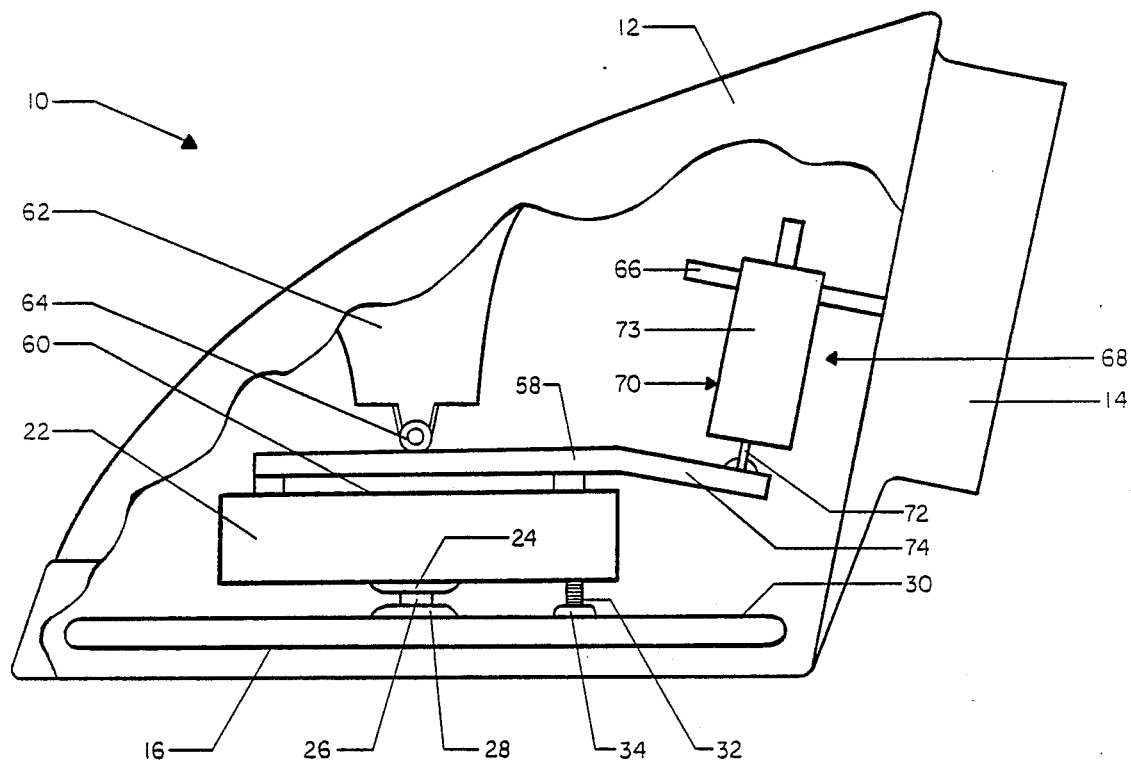
FIG. 3 is a plan view of the rearview mirror of FIG. 2 with a portion of the housing broken away.

Referring now to FIG. 3, it will be seen that the plane mirror is adapted for movement within the housing by an adjustable mounting means 20. Typically, plane mirrors are adjustable either mechanically by means of a Bowden cable, or electrically by means of electric motors. In the embodiment shown in FIG. 3, the adjustable mounting means 20 comprises a housing 22 containing a pair of electric motors. The housing 22 mounts a socket 24 which supports a rotatable ball 26. The ball 26 is also seated in a second socket 28 which is secured to a backing plate 30 which holds the plane mirror 16. The ball 26 thus forms a pivot point about which the mirror 16 can rotate with respect to the adjustable motor housing 22.

An actuator shaft 32 extends from the housing 22 and is pivotally connected to the backing plate 30 by conventional means such as a bracket 34. The actuator shaft 32 is typically driven by a worm gear on the shaft of the motor mounted within the adjustable motor housing 22. Typically, two motors, each adapted to drive a separate actuator shaft are mounted within the adjustable motor housing 22 so that two actuator shafts extend toward the mirror backing plate 30. Thus, two perpendicular axes of rotation are defined about the adjustable mirror pivot 26.

Referring again to FIG. 2, the electric motors are electrically connected by means of the cable 36 to a switch 38 which controls the actuation of the motors within the adjustable motor housing 22. The mirror structure and adjustment means just described are conventional and many adaptations and variations are provided depending upon the particular application required by a given vehicle. This adjustment mechanism, however, is completely independent of the repositioning system according to the invention.

A typical vehicle also has a directional signal means to indicate a change in direction of the vehicle. As illustrated in FIG. 2, the directional signal means 38 is customarily provided on the steering column 40 on the driver's side of the vehicle. A lever 42 controls the directional signal means 38 at the discretion of the driver, and is mounted to the steering column 40 adjacent the steering wheel 44.

Figure 6:
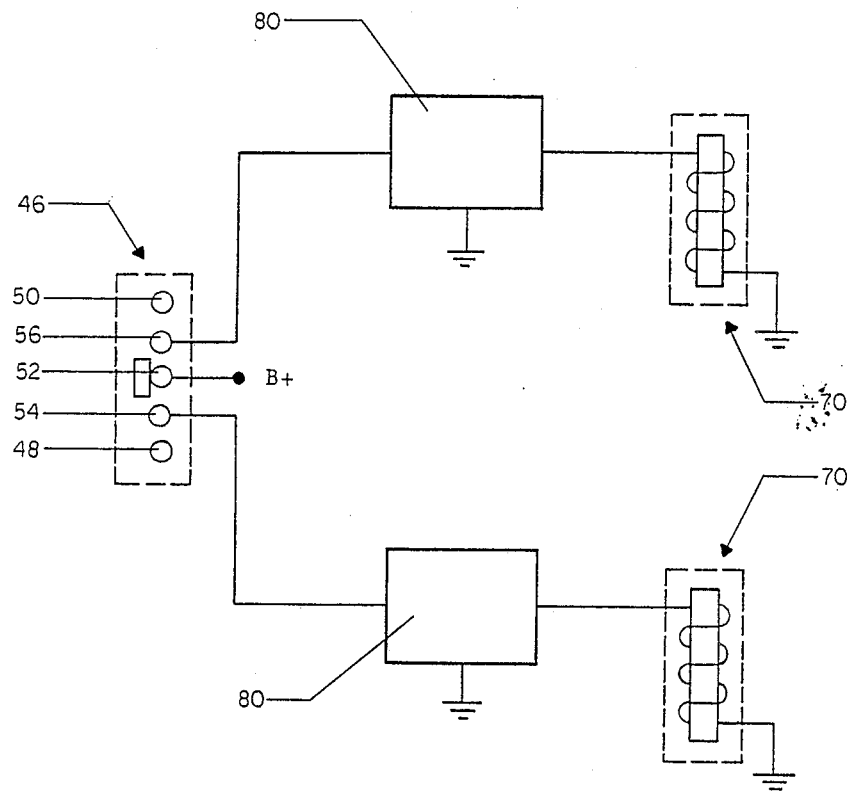
FIG. 6 is a schematic diagram illustrating the electrical circuitry of the directional signal means.

Referring now to FIG. 6, the directional signal means typically comprises a five-position switch 46 mounted in the steering column 40, with each position selectively operated by the lever 42. The switch 46 provides a first position 48 to signal a left turn of the vehicle and a second position 50 to signal a right turn of the vehicle. Intermediate the left turn position 48 and the right turn position 50 is the neutral position 52 which generates no signal. The three positions 48, 50, and 52 are typically toggle positions where the switch 46 can be left in any one of the three positions until moved, manually or otherwise. Intermediate the left turn position 48 and the neutral position 52 is a fourth position 54 which generates a signal to indicate a left lane change of the vehicle. Similarly, intermediate the right turn position 50 and the neutral position 52 is a fifth position 56 which generates a signal to indicate a right lane change of the vehicle. The lane change signals 54, 56 are typically not toggled. In other words, the lever 42 is biased away from the lane change positions 54, 56 such that it must be manually held in either position when a lane change is to be indicated.

The directional signal means just described is conventional and is customarily provided in most vehicles. When the left turn position 48 of the directional switch 46 is engaged, an electrical signal is typically sent to the taillights of a vehicle through a flasher (not shown) to cause the light to intermittently glow. Similarly, when the switch 46 is in either the right lane change position 56 or the right turn position 50, a right taillight (not shown) intermittently glows. Thus, a visual signal is sent to other vehicles regarding the driver's intentions to change the direction of the vehicle.

Referring again to FIG. 3, the plane mirror mounting means 20 also comprises a bracket 58 which is rigidly secured to the back 60 of the adjustable motor housing 22. The bracket 58, in turn, is mounted by means of a pedestal 62 to the housing 12. The pedestal 62 is preferably integral with the housing and may be molded therewith. The bracket 58 is mounted to the pedestal 62 by any suitable conventional pivot means 64 such as a ball and socket. The pivot 64 may be a universal pivot such as a ball and socket, or a hinge for rotation about a single axis. A mounting bracket 66 extending toward the interior of the housing 12 mounts an actuating means 68 for moving the bracket 58 with respect to the housing 12. The actuating means 68 comprises an electric solenoid 70 which may be conventional. The solenoid 70 is rigidly secured to the bracket 66. A reciprocating push rod 72 extends from a cylindrical portion 73 of the solenoid 70 and is pivotably connected to the outer end 74 of the bracket 58. Thus, when the solenoid is electrically energized, the push rod 76 pushes against the end 74 of the bracket 58 causing the bracket 58 to pivot about the pivot point 64 to an indexed position. When the solenoid is de-energized, the push rod 76 is retracted within the cylinder 73, thus causing the bracket 58 to pivot back to its original position. A separate biasing means, such as a coil spring, may be used to cause the bracket 58 to return.

The actuating means 68 is electrically connected by means of a cable 78, as shown in FIG. 2 and 6, to the directional signal switch 46. Referring again to FIG. 6, there is preferably a delay timer 80 interposed in the electrical circuit between the switch 46 and the solenoid 70. When the solenoid is energized, the plane mirror can be made to assume the position illustrated in FIG. 4.

Figure 5:
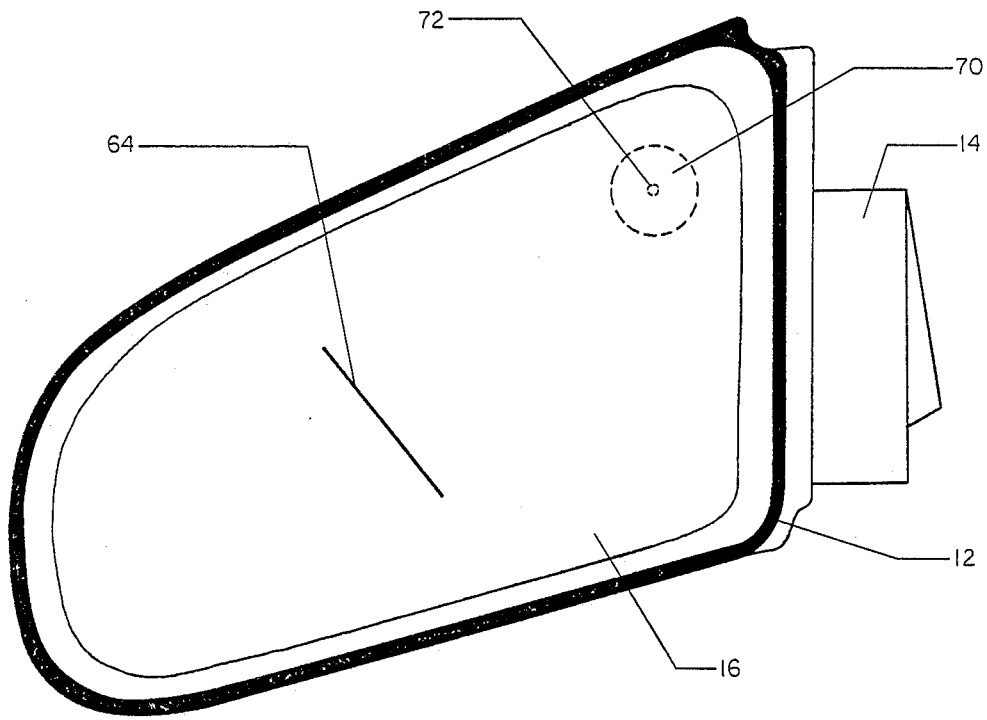
FIG. 5 is a front elevational view of the rearview mirror of FIG. 2.

FIG. 5 illustrates the position of the solenoid 70 with respect to the plane mirror 16. It will be seen that the solenoid is mounted so to cause the plane mirror mounting means and thus the plane mirror to pivot about a single axis from a normal position to an indexed position. The indexed position of the plane mirror is preferably that position where a driver can readily view the front end including the bumper of a vehicle located in the "blind spot" as illustrated in positions B and C of FIG. 1. The position of the solenoid 70 is thus preconfigured and not adjustable once mounted in the housing 12.

Figure 4:
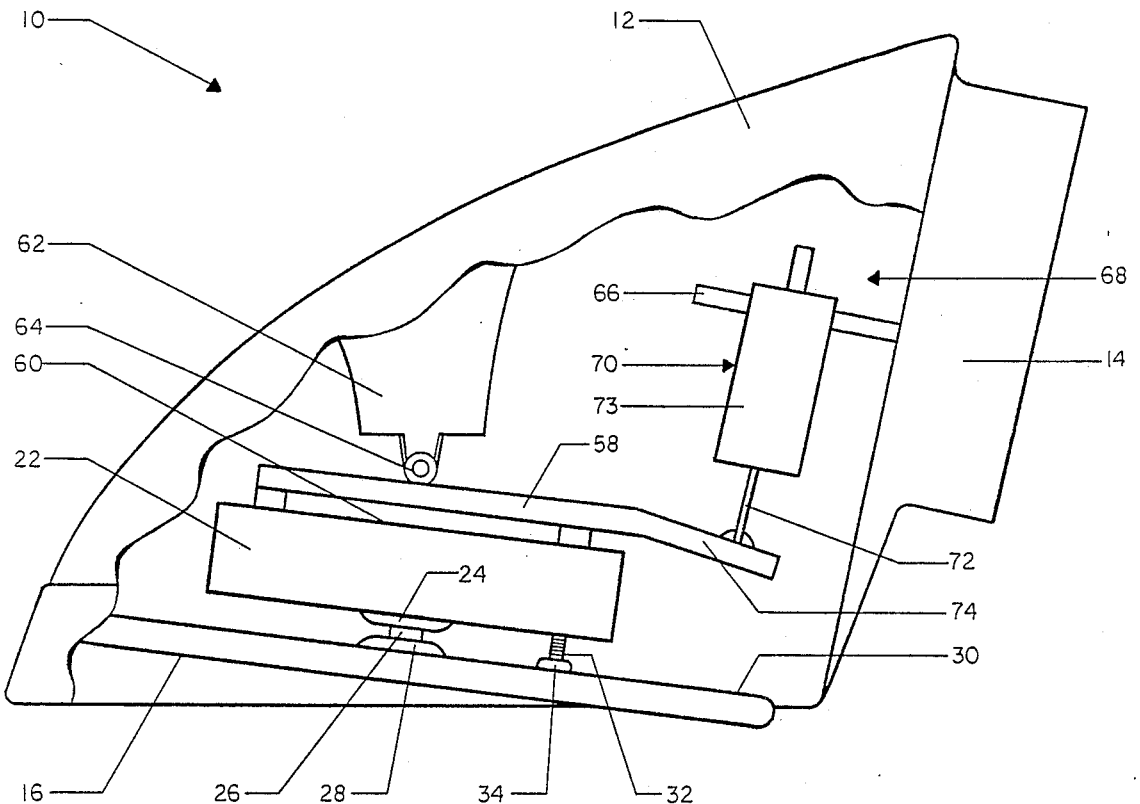
FIG. 4 is a plan view similar to the view of FIG. 3, but with the solenoid actuated and with the bracket in an extended position.

In operation, a driver desiring to make a left lane change, for example, will depress the lever 42 to cause the switch 46 to engage the left lane change position 54. Thus engaged, the directional signal means simultaneously sends a flashing signal to the left taillight of the vehicle, and sends an electrical signal to the delay timer 80. When the switch 46 maintains the left lane change position 54 for more than the time allotted in the delay timer 80 (preferably one second), the solenoid 70 mounted in the left mirror assembly 10 is actuated. The push rod 76 causes the bracket 58 to pivot about the pivot point 64 and thus rotate the entire mirror mounting means 20 and thus the plane mirror 16 to the extended position as illustrated in FIG. 4. Thus repositioned, the plane mirror 16 will provide a field of vision to the driver which encompasses the blind spot to the left rear of the vehicle. Because of the speed at which modern vehicles travel, it is important that the movement of the plane mirror 16 between the normal position and the indexed position be very quick. The driver can thus quickly visually determine the existence of a clear field in the blind spot in order to complete the change in direction of the vehicle, and it will be seen that such determination can be made without significantly removing the driver's eyes from the line of direction of the vehicle.

Figure 1:
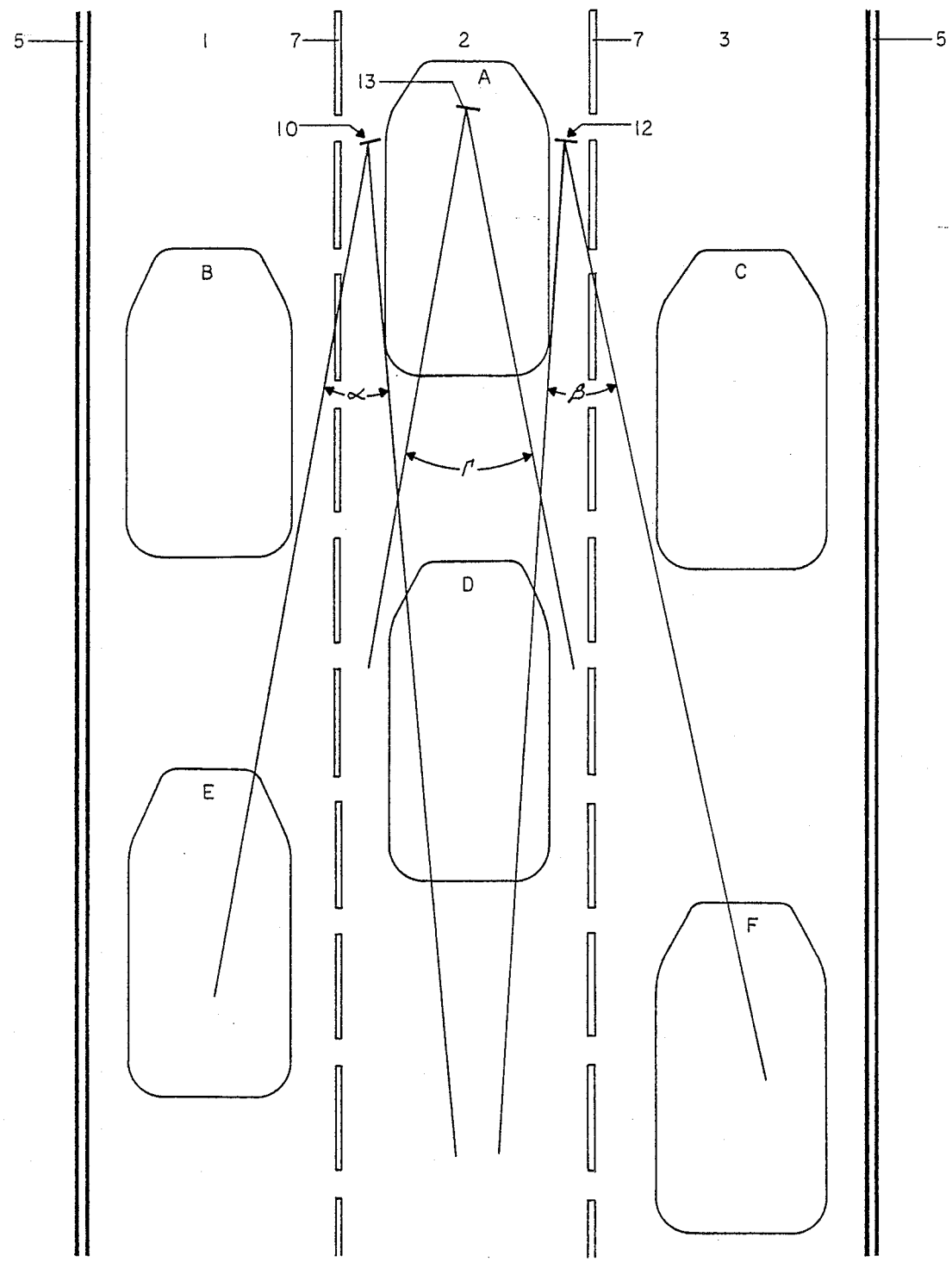
FIG. 1 schematically illustrates the field of vision provided by a conventional rearview mirror system.
Figure 8:
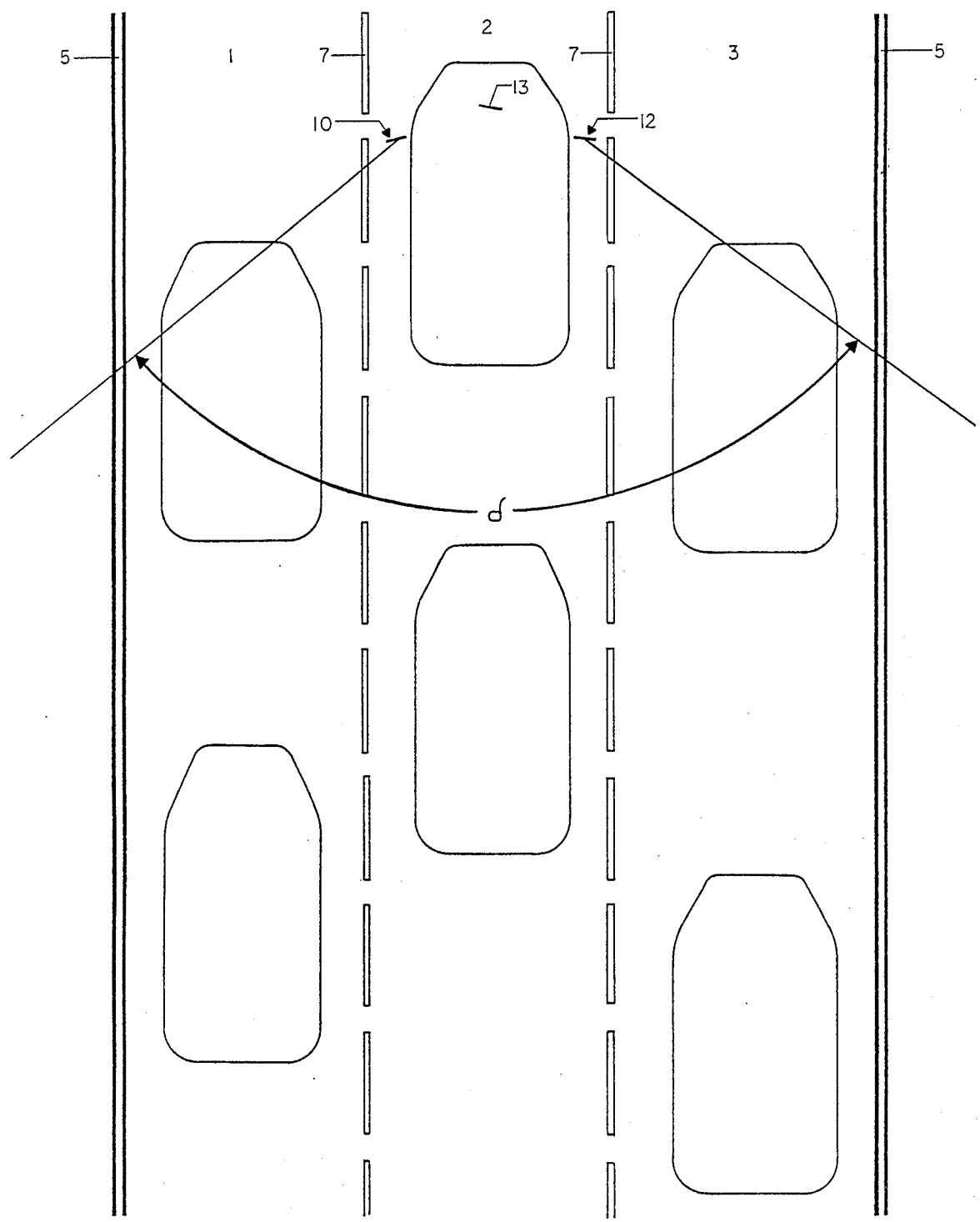
FIG. 8 is a schematic view similar to FIG. 1, illustrating the field of vision provided by a rearview mirror system according to the invention, mounted on both sides of a vehicle.

Thus, the mirror can be changed to the blind-spot position as illustrated in FIG. 4 when the "lane change" section of the directional signal system is used. Further, this repositioning of the mirror is solely at the discretion of the driver. The position can be maintained by the driver as long as the driver wishes by simply manually holding the lever 42 in the lane-change position for as long as needed. It will be seen that when the lever 42 is manually placed in the turn-signal position, no signal is sent to the solenoid 70, and the mirror 16 remains in the normal position. As shown in FIG. 8, the invention provides a total available field of vision to the rear of a vehicle subtended by angle δ which is greater than that provided by conventional mirror systems (the sum of angles δ, β, and Γ as shown in FIG. 1).

Figure 7:
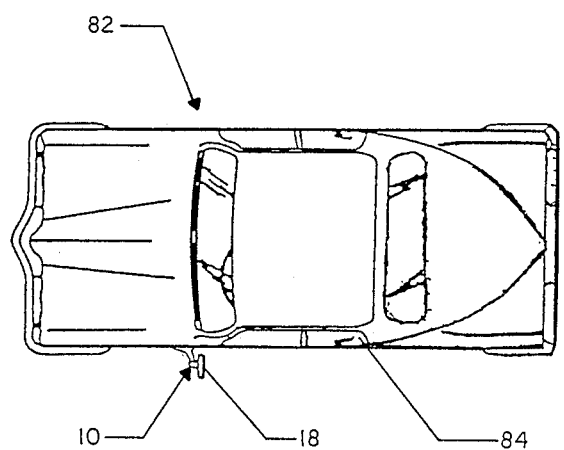
FIG. 7 is a plan view of a vehicle with the rearview mirror system of the invention installed to illustrate the visual indicia for targeting the focus of the mirror.

It will readily become apparent that it is important to target each mirror in order to render the blind spot observable when the directional signal is engaged. The targeting means is best illustrated in FIGS. 2 and 7. As seen in FIG. 2, a visual indicium 18 is provided on the surface of the plane mirror 16. A second visual indicium 84 is provided on the vehicle preferably near the rear window where it can be seen in the rearview mirror 10 by the driver. When the driver aligns the first visual indicium 18 with the second visual indicium 84 in the line of sight provided in the mirror 16, a reference position is established for the plane mirror 16 with respect to the vehicle. Thus, each driver with varying heights and varying positions within the vehicle can independently adjust the mirror by means of the adjusting means to a reference position. The position of the solenoid 20 with respect to the plane mirror 16 is fixed for each vehicle. When properly targeted, the plane mirror 16 will automatically be indexed to show the blind spot with respect to that vehicle when the rearview mirror repositioning system is engaged. The location of the indicia 18, 84 will preferably be established to obtain the optimum field of vision for each vehicle.

It will thus be seen that a rearview mirror repositioning system in accordance with the invention may be used on demand, provides no image distortion in the wider field of vision, and can be used on manual mirrors and sophisticated electrically operated mirrors on any vehicle.

Reasonable variation and modification are possible within the scope of the foregoing disclosure and drawings without departing from the scope of the invention as defined by the appended claims.

The embodiments of the inventions on which an exclusive property or privilege is claimed are defined as follows:

1. In a rear view mirror system for a vehicle, said system including a plane mirror, and means for mounting the plane mirror to the vehicle, and said vehicle having directional signal means to indicate a change in direction of the vehicle, the improvement comprising:
   actuating means adapted to receive a signal from the directional signal means and operatively connected to the plane mirror mounting means for automatically moving the plane mirror between a normal position and an indexed position with respect to the vehicle when said actuating means receives a signal indicating a change in direction of the vehicle,
   a first visual indicium located on the vehicle, and
   a second visual indicium on said plane mirror adapted to be aligned with the first visual indicium when the first visual indicium is viewed in the plane mirror by pivoting said plane mirror with respect to the vehicle to establish said normal position.

2. A rear view mirror system according to claim 1 wherein the directional signal means comprises
   a first signal to indicate a left turn of the vehicle;
   a second signal to indicate a right turn of the vehicle;
   a third signal to indicate a left lane change of the vehicle; and
   a fourth signal to indicate a right lane change of the vehicle.

3. A rear view mirror system according to claim 2 wherein the bracket is moved to the indexed position only in response to one of the third signal and fourth signal.

4. A rear view mirror system according to claim 3 wherein the signal from the directional signal means is delayed before it is received by the actuating means.

5. A rear view mirror system according to claim 1 wherein the plane mirror mounting means comprises a housing connected to said vehicle and a bracket pivotally connected to said housing, said actuating means being mounted to said housing and operatively connected to the bracket so that said bracket pivots when said actuating means is actuated.

6. A rear view mirror system according to claim 1 wherein the actuating means includes a solenoid having a push rod pivotably connected to the bracket for causing the bracket to pivot between a normal position and an indexed position.

7. A rear view mirror system according to claim 1 wherein the signal from the directional signal means is delayed before it is received by the actuating means.

8. In a rearview mirror system for a vehicle, said system including a housing mounted to the vehicle, a plane mirror, means for mounting the plane mirror in the housing, said plane mirror being pivotably connected to the plane mirror mounting means, and said vehicle having directional signal means to indicate a change in direction of the vehicle, the improvement comprising:

said vehicle including a first visual indicium and said plane mirror including a second visual indicium adapted to be aligned with the first visual indicium by pivoting the plane mirror with respect to the plane mirror mounting means to establish a reference position for the plane mirror with respect to the vehicle; and actuating means adapted to receive a signal from the directional signal means and operatively connected to the plane mirror mounting means for automatically changing the position of the plane mirror with respect to the vehicle when said actuating means receives a signal indicating a change in direction of the vehicle.

* * * * *